Nov. 8, 1960   W. B. JONES   2,959,456
LUBRICATION APPARATUS
Filed Dec. 13, 1957   3 Sheets-Sheet 3
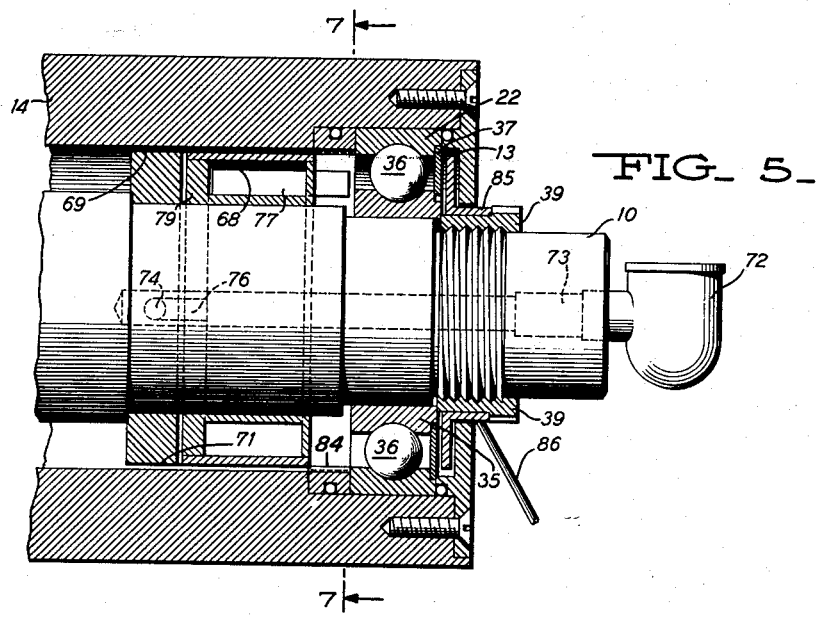
FIG_ 5_
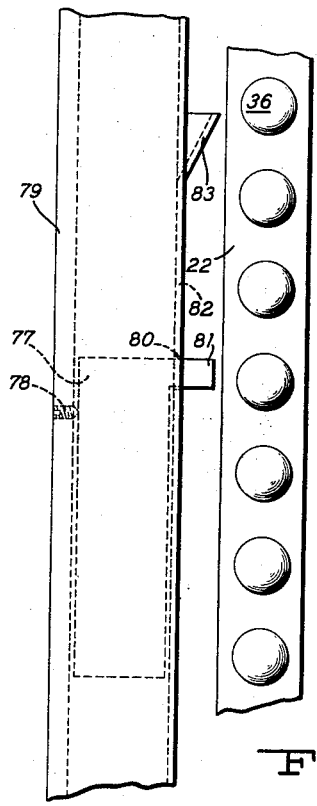
FIG_ 6_
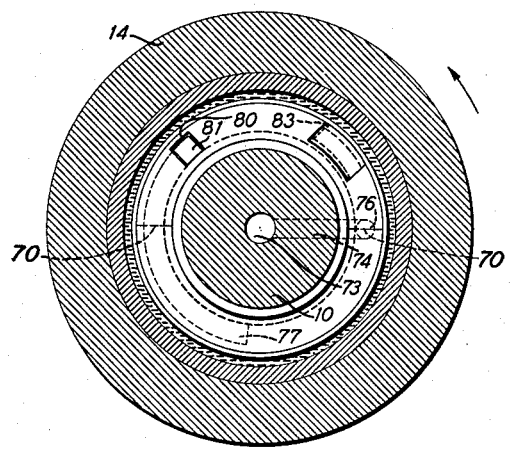
FIG_ 7_

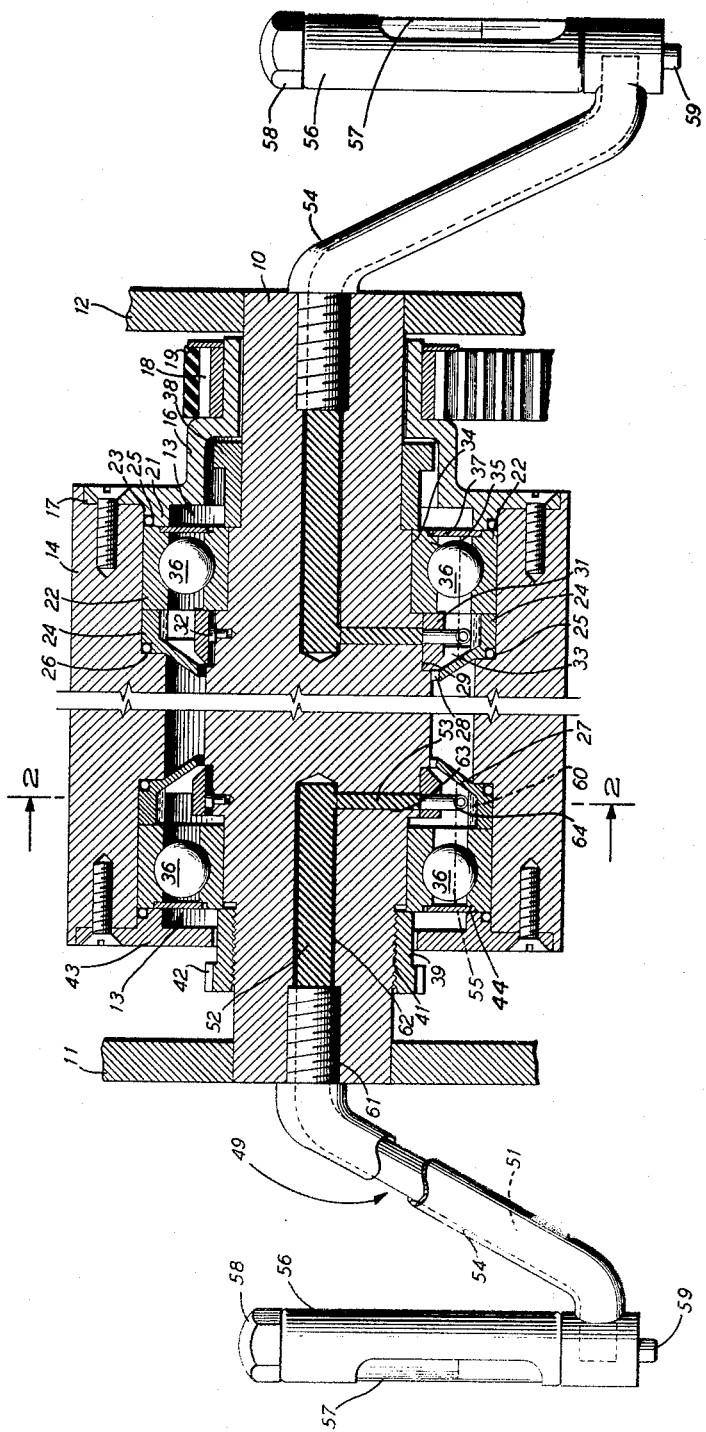
INVENTOR.
WILLIAM B. JONES
BY Donald F Voss
ATTORNEY

United States Patent Office 2,959,456
Patented Nov. 8, 1960

2,959,456

LUBRICATION APPARATUS

William B. Jones, Endicott, N.Y., assignor to International Business Machines Corporation, New York, N.Y., a corporation of New York Filed Dec. 13, 1957, Ser. No. 702,611

14 Claims. (Cl. 308—187)

This invention relates to lubrication means and particularly to lubrication means for rotating drums.

A general object of the invention is to provide means for properly lubricating rolling element bearings which journal a rotatable element or drum on a stationary support where the drum is adapted to be rotated at very high speeds.

Another object of the invention is to provide means for lubricating rolling element bearings which control the maximum amount of lubricant circulated to the bearings.

A further object of the invention is to provide means for lubricating roller element bearings which apply the lubricant to the bearings in the form of a mist.

Still a further object of the invention is to lubricate roller element bearings with a lubricant in the form of a mist where the elements journalled by the bearing are operatively associated to atomize the lubricant.

Still another object of the invention is to provide means for lubricating a high speed rolling bearing assembly with a rotating outer race and a lubricant chamber adjacent thereto wherein a fluid pressure head develops to control the application of lubricant to the bearings.

A major problem involved in lubricating roller element bearings under high speed operation is that an excessive amount of lubricant will cause the bearing elements to overheat and become permanently damaged just as in the case of the bearing elements not being lubricated an adequate amount or running dry. It is also important to provide the proper amount of lubricant to the bearing assembly according to the conditions of operation. In other words, the bearing assembly should be properly lubricated as the elements journalled by the bearing assembly start from a rest position as the elements come up to speed and during continuous or long periods of sustained operation.

Most standard rolling element bearing seals are not completely oil tight at high speed operation and therefore it is difficult to retain the enclosed lubricant for prolonged periods under high speed operation. Hence even after the elements are brought up to speed, lubricant must be applied to the bearing assembly to satisfy sustained high speed operation. In other words, under high speed sustained operation a fluid pressure head develops by the centrifugal force acting upon the lubricant or oil to cause the same to pass around the standard sealing means. Of course, as this action continues the bearing would run dry unless the condition is detected and additional lubricant in the proper amount is applied to the bearing assembly.

To detect the condition of a bearing going dry is sometimes difficult, particularly where the assembly is located in a position which does not easily permit periodic inspection. Further, it should be remembered that only a proper amount of lubricant can be added to the bearing assembly to insure that the same does not overheat or run dry.

The invention is directed to satisfy all of the requirements mentioned above. This invention finds application in an installation wherein a rotating drum such as a magnetic drum for use in high speed calculators is journalled on a pair of spaced ball bearing assemblies. The drum is mounted on the outer races for the balls and the inner races are supported on a stationary shaft or the like. Lubricant is applied to the balls between the inner and outer races from one end of the assembly and the other end of the assembly is provided with the usual end sealing ring or shield. Of course, the invention is not limited to this particular application.

This invention will be illustrated by two examples; however, in either case, a lubricant chamber is disposed or formed adjacent the end of the bearing assembly not provided with the end sealing ring. A proper amount of lubricant is applied to the bearing assembly from the lubricant chamber.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a partial longitudinal sectional view of the lubricant chamber and bearing assembly of an embodiment of the invention.

Fig. 5 is a partial longitudinal sectional view of the lubricant chamber and bearing assembly of another embodiment of the invention.

Fig. 6 is a partial longitudinal projection or developed view of the bearing assembly and lubricant chamber to show the path taken by the pressure head of air developed by the rotating drum.

Fig. 7 is a transverse sectional view taken on the line 7—7 in Fig. 5 and looking in the direction of the arrows to show the position of the wick in the lubricant chamber and the deflecting scoop formed therein.

Figure 3:
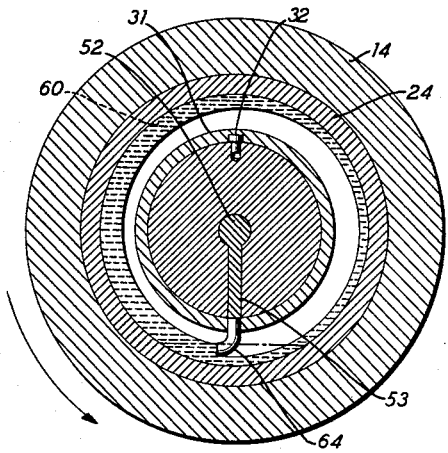
Fig. 3 is a transverse sectional view like Fig. 2 to show the relationship of the control tube and the oil in the lubricant chamber where there is an excess amount of oil in the lubricant chamber.

Referring now to the drawings and particularly to Fig. 1, there is shown a stationary shaft 10 fixedly supported at each end by frame members 11 and 12, respectively. A pair of longitudinally spaced ball bearing assemblies 13 embracing the shaft 10 are adapted to journal a rotatable drum or cylindrical member 14 for rotation at high speed. This drum 14 is provided with a magnetizable peripheral surface upon which data is impressed in the form of magnetized spots, in any suitable manner for use in a calculator or other data processing equipment.

The disclosed drum 14, in this instance, is provided with a bell-shaped driving member 16 encircling the stationary shaft 10 and has one end 17 secured to the end of the drum 14 while the other end of the member 16 includes integrally therewith a toothed portion 18 adapted to mesh with a toothed driving belt or the like 19 to rotate the drum 14 at the desired speed. Of course the driving member 16 is provided with running clearance with respect to the stationary shaft 10. Formed as part of the driving member 16, a ring or annular portion 21 projects inwardly from the end 17 to bear against one end of an outer race 22 of one of the bearing assemblies 13 which is pressed into an annular shouldered end opening or recess 23 in the drum 14 to frictionally grip the same. The other end of the outer race 22 abuts an annular insert 24 disposed within the recess 23 to bear against a shoulder 26 thereof. This arrangement prevents axial displacement of the outer race 22.

Additionally, O-ring seals 25 are carried by the annular projection 21 and the insert 24 around their outer peripheries for engagement with the recess 23 to seal against discharge of lubricant therearound. The annular insert 24 is provided with a flange 27 integral therewith and extending inwardly at an angle therefrom and away from the adjacent end of the bearing assembly 13. The flange 27 has an inner edge 28 which terminates with proper running clearance at an annular shouldered end opening or recess 29 provided in the stationary shaft 10 to receive an annular insert 31 which is secured thereto by means of a set screw 32 or the like. The flange 27 of the annular insert 24 forms one end of a lubricant retaining chamber 33. The shaft 10 is provided with another recess 34 which is adjacent the recess 29 to receive and support an inner race 35 of the bearing assembly 13. A plurality of rolling type elements or balls 36 are circumferentially spaced between the races in the usual manner.

The balls 36 of each bearing assembly are flanked on one side by an annular bearing sealing ring or shield 37 which cooperates with the inner and outer races to enclose the other end of the lubricant retaining chamber 33. The outer periphery of each sealing ring 37 closely fits a shoulder 44 provided by an end opening recess in the outer race. While the outer circumference of the sealing ring 37 closely fits the recess in the outer race 22 to provide a lubricant seal it is not of such a dimension to stress the outer race 22.

Essentially the two bearing assemblies 13 are identical; however, the inner race 35 of the bearing assembly at the pulley end of the drum 14 is prevented from being moved or displaced axially by a sleeve 38 which is disposed within the bell-shaped driving member 16 to fixedly embrace the shaft 10 in a manner that one of its ends bears against the adjacent end of the inner race to hold the same tightly against the shoulder of the recess 34. The inner race 35 of the bearing assembly 13 at the other end of the drum 14 is disposed within the recess 34 to embrace the shaft 10 in a manner that it may be displaced axially therealong.

In this example a minimum eccentricity of the drum 14 is essential. Thus the bearing assemblies are adjusted to provide for substantially zero clearance when the drum is rotating at its operating speed of 12,500 r.p.m. This adjustment is accomplished by means of an internally threaded sleeve 39 which is threadedly engaged with a threaded portion 41 of the shaft 10 where one of its ends bears against the outer end of the inner race 35. The outer end of the sleeve 39 is provided with a plurality of gear teeth 42. Hence by turning the sleeve 39 by means of a suitable gear, not shown, which is disposed to mesh with the teeth 42, a force is exerted against the abutting inner race 35. This force is transmitted through the balls 36 to the outer race 22 which is pressed into the recess 23 and having its inward face abutting the annular insert 24 and its outward face abutting a projection on a cap member 43. The drum 14 transmits the force from the race 22 to the outer race 22 at the other end of the drum and from the outer race 22 to the inner race 35 through the balls 36. Since the inner race 35 at the other end or pulley end of the drum 14 is prevented from axial displacement, the force exerted by the sleeve 39 effects radial forces to reduce the ball bearing clearance substantially to zero. Since the bearing adjustment forms no part of this invention, a further detailed description will not be given.

In order to lubricate the balls 36, oil is supplied to the lubricant retaining chamber 33 by means of an oil saturated wick 49 composed of three sections 51, 52 and 53, respectively. The section 51 of the wick 49 is disposed within a wick tube 54 extending angularly from and in fluid communication with the bottom portion of an oil reservoir 56. The reservoir 56 is provided with a sight glass 57 to facilitate the observance of the level of the oil therein; and it will be seen shortly, that with the drum 14 at rest, the oil level in the reservoir 56 is the same as the oil level in the lubricant retaining chamber 33. Hence upon establishing the proper amount of lubricant required to properly lubricate the bearing assembly 13, the reservoir can be marked to provide a gage for the proper oil level and this level then may be maintained by adding oil to or draining oil from the reservoir 56 through the facilities of fill and drain plugs 58 and 59, respectively.

The other end of the wick tube 54 is threadedly engaged with a threaded portion 61 of a blank-end bore 62 extending inwardly from the end of the shaft 10 and containing the section 52 of the wick 49. The blank end of the bore 62 communicates with a radial bore 63. The radial bore 63 contains the wick section 53 and extends to the annular insert 31 which is drilled to receive a 90° elbow or control tube 64, suitably secured therein with the outer open end thereof facing against the direction of drum rotation. The section 53 of the wick 49 extends the length of the bore 63 and is in contact with the wick section 52. By means of this wick arrangement oil flows therethrough by means of capillary action and the oil level in the lubricant retaining chamber 33 becomes the same as in the reservoir 56 as the oil seeks its own level and therefore it is possible to check the static level of the oil level in the lubricant retaining chamber 33 by examining the visible oil level in the reservoir 56.

Figure 4:
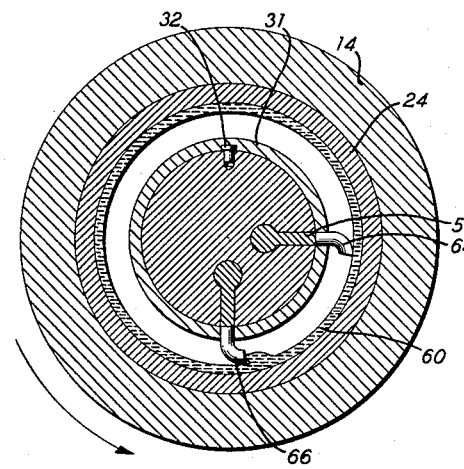
Fig. 4 is essentially a transverse sectional view as in Fig. 2 with the addition of an oil supply tube for sustained drum operation.

The oil level in the lubricant retaining chamber 33 and the reservoir 56 changes as the drum 14 is rotated, that is, the static volume of oil shown in Fig. 1 by the dashed line 55 is centrifuged about the inner periphery of the lubricant retaining chamber 33 as shown in Figs. 4 and 5 to form a ring of oil 60 and the control tube 64 returns the oil in excess of this ring to the reservoir. As the static oil level centrifuges about the inner periphery of the lubricant retaining chamber to form the ring of oil 60 the level of oil therein has been reduced with respect to the level of oil in the reservoir. If this difference in levels of oil existed under static conditions oil would flow from the reservoir 56 to the lubricant retaining chamber 33. However, as the drum 14 rotates, not only does the oil centrifuge about the inner periphery of the chamber 33, but sufficient pneumatic or fluid pressure is created within the chamber by the rotating drum to oppose any tendency for oil to flow from the reservoir 56 to the chamber 33. In fact, the oil level in the reservoir may increase slightly due to the back pressure created on the wick 49 as the air pressure builds in the chamber 33. The control tube 64 is quite significant in that it is directed against the direction of drum rotation so that the fluid pressure created by the rotating drum 14 will act upon the wick 49 to prevent further flow of oil into the chamber 33. Further, since it is not desirable to have the oil in the chamber in direct contact with the balls during high speed rotation of the drum, the tube is extended into the chamber 33 so that it will scoop oil from the ring 60 which exists above the level of the outer race and will then just contact the inner periphery of the ring of oil 60 to deflect or disperse very fine particles of oil to the inner portion of the chamber 33. Since as the drum 14 rotates, a turbulent fluid or air flow is developed within the chamber 33 to atomize the dispersed particles of oil into a mist which surrounds the balls 36 of the bearing assemblies 13 to lubricate the same.

Figure 2:
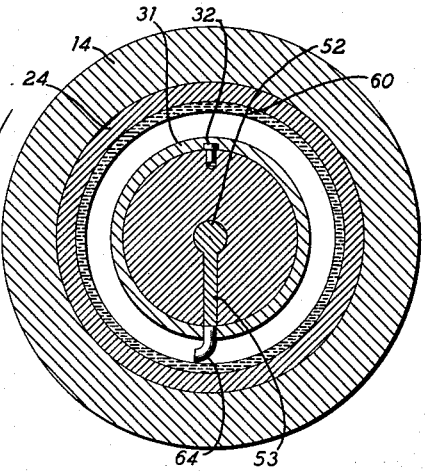
Fig. 2 is a transverse sectional view taken on the line 2—2 of Fig. 1 and looking in the direction of the arrows to show the relationship of the control tube and the oil in the lubricant chamber.

The above describes an arrangement for providing bearing lubrication, where the drum 14 is being rotated intermittently. As the drum 14 is first caused to rotate, a relatively short period of time exists between the static and the centrifugal oil level condition in the chamber 33 and during this interval the balls 36 are coated with oil as the same pass through the static level of oil. As the drum 14 comes up to speed the oil in the chamber 33 centrifuges to form the oil ring 60 and if there is an excessive volume of oil, the tube 64 scoops up the same and returns it to the reservoir 56 by means of the wick 49 as shown in Fig. 2. When the drum is being brought to a rest condition or during the transition from an oil ring 60 to a static level, the ring of oil 60 cascades over the balls 36 leaving a film of oil thereon.

While the drum 14 is operating some oil escapes and is lost from chamber 33 and therefore to provide proper bearing lubrication of continuous or long periods of sustained drum operation it is often necessary to add some makeup oil into the system to prevent the bearing assembly from going dry. Since the control tube is directed in a manner whereby the fluid pressure developed by the rotating drum acts to inhibit additional oil to flow from the reservoir 56 into the chamber 33, an oil supply tube 66, Fig. 4, is provided to supply oil from the reservoir 56 to the chamber 33. In this instance the control tube 64 and the oil supply tube 66 extend from the annular insert 31 into the chamber 33 with their open ends facing each other as shown in Fig. 4. The bores for containing the oil saturated wicks leading to the tubes 64 and 66, respectively, are essentially of the same construction as above-described bores for the wick 49 except that the same are located a distance from the center of the shaft 10 as shown in Fig. 4. It is not thought necessary to describe in detail the particular location of the bores.

Thus with the open mouth of the supply tube 66 facing in the direction of the turbulent fluid or air stream created by the rotating drum 14, oil will be permitted to flow from the reservoir 56 to the chamber 33, in fact the turbulent fluid flow developed by the rotating drum 14 will enhance oil flow from the tube 66. The control tube 64 continues to function in the same manner as afore-described. Hence a proper volume of oil will be maintained in the chamber 33 during continuous operation of the drum 14 as the tube 66 supplies oil to the chamber 33 and the tube 64 removes or returns any excess volume of oil to the reservoir 56. During operation with this arrangement the balls 36 are initially coated with a light film of oil as they pass through the oil in the lubricant retaining chamber 33 during the transition period of the oil changing from the static level to the centrifuged level or oil ring 60, as the drum comes up to speed. This light film of oil coated upon the balls is initially quite adequate to lubricate the bearing assemblies for high speed rotation. Once the drum has come up to speed, additional oil will be applied to the balls 36 in the form of a mist as the control tube 64 disperses fine particles of oil into the inner portion of the chamber 33 and the turbulent fluid flow developed therein by the rotating drum 14 causes these fine particles of oil to atomize. As the drum continues to rotate, the additional oil required to make up for losses in the system is supplied from the reservoir 56 through the supply tube 66. Of course if an excess of oil is supplied, the same will be returned to the reservoir by means of the control tube 64.

It is seen from the above that a portion of the lubricant is dispersed into fine particles which are atomized into a mist to surround the bearings whereby the turbulent fluid flow developed by the drum is utilized to atomize the fine particles of lubricant. Further it is seen that the control tube functions in cooperation with the fluid pressure head developed by the drum to return excess lubricant to the reservoir and to disperse a portion of the lubricant into fine particles to facilitate or enable the turbulent fluid flow in the lubricant retaining chamber to atomize the lubricant into a mist. It is also seen that the supply tube furnishes additional lubricant into the chamber to insure that there will be an adequate amount of lubricant to engage the control tube to be dispersed into fine particles.

The invention is also illustrated by way of an example as shown in Fig. 5. In this example the drum and the bearing assembly have remained unchanged from the example previously described and therefore like parts will be given like reference characters. Since, as in the previous example, the structure of the lubricating means is the same for each bearing assembly, the lubricating means for only one bearing assembly will be described. An annular lubricant retaining chamber 68 embraces an annular shouldered end opening or recess 69 provided in the shaft 10. A shaft ring 71 is secured about the recess 69 to abut the shoulder thereof to provide a mounting for securing the lubricant retaining chamber 68 against movement about or along the recess 69 and facilitate easy removal of the same.

In this instance the oil within the lubricant retaining chamber is not centrifuged to form an oil ring as in the previous example. Oil is supplied to the chamber 68 from a reservoir 72 which is in communication with a bore or oil hole 73 extending longitudinally into the shaft 10 and beyond the lubricant retaining chamber 68. The oil hole 73 communicates with an oil hole 74 extending radially therefrom and into the shaft ring 71 to approximately the center portion of the width thereof to communicate with a longitudinal oil hole 76 extending therefrom toward the reservoir and into the lubricant retaining chamber as shown in Figs. 5 and 7.

The path just described permits free flow of oil from the reservoir 72 to the chamber 68. The level of oil within the chamber reaches the level of oil in the reservoir 72 and is represented schematically by the dashed line 70, Fig. 7.

An arcuate shaped wick 77 made from material such as spherical bronze is secured within the chamber 68 by means of a set screw 78 or the like threaded into a suitable tapped hole in the rear annular wall 79 of the chamber 68 as in Fig. 6. The wick 77 has a projection 81 extending therefrom which is adapted to protrude through a suitable opening 80, Fig. 7, provided in the wall nearest the reservoir or the annular forward wall 82 of the chamber 68, as shown in the developed view of Fig. 6. The wick 77 including the projection 81 becomes saturated with oil which permeates therethrough by means of capillary action. It is thus seen that the wick 77 has available at all times a supply of lubricant in the form of dispersed particles which are atomized by the turbulent fluid flow developed by the rotating drum 14. The lubricant retaining chamber 68 is preferably provided with a deflecting scoop 83 angularly projecting from the forward wall 82 thereof. The deflecting scoop 83 could be formed from the forward wall 82 as shown in Fig. 6 and thereby leaving an opening therein for air to enter therein or could be suitably secured thereto in register with a hole provided therein. The deflecting scoop 83 is disposed with its opening facing opposite to the direction of turbulent fluid flow and is provided to direct a portion of the turbulent fluid flow or air stream developed by the rotating drum into the chamber 68, as shown in Fig. 6. This action causes the oil particles to leave the wick 77 in the form of a mist which leaves the opening 80 about the projection 81 to saturate the area around the balls 36 of the bearing assembly 13 to lubricate the same.

While a major portion of the turbulent fluid flow developed by the rotating drum 14 enters the chamber 68, the portion not entering therein passes through the projection 81 to atomize the oil particles therein. The oil particles within the wick 77 which become atomized are replaced by like quantities of oil by means of capillary action. The size of the oil particles is determined by the porosity of the wick 77 which can be controlled by choosing the proper size of bronze spheres for making the wick 77. The deflecting scoop 83 also functions to deflect or collect the accumulation of oil in the area adjacent the bearing assembly, that is, a portion of the mist will settle and a ring of oil 84 as shown in Fig. 5 will be formed therefrom as the same is centrifuged about the inner periphery of the drum 14 and the deflecting scoop 83 will collect the oil in excess of the outside radius of the scoop.

The sealing ring 37 controls oil leakage as in the previous example; however, under most conditions, some oil is forced past this seal 37 by centrifugal action. An annular baffle 85 made of spherical bronze or like material disposed adjacent the seal 37 to embrace the sleeve 39 absorbs the oil forced past the seal 37 and a disposable felt wick 86 is suitably maintained in contact with the baffle 85 to drain off the absorbed oil to a suitable collector, not shown.

With the above arrangement a mist of oil is created by action of the turbulent fluid flow developed by the rotating drum 14 which is directed into the lubricant retaining chamber 68 by means of the deflecting scoop 83. The turbulent fluid flow within the chamber 68 causes the oil particles suspended by the wick 77 to atomize to form a mist of oil which leaves the chamber 68 through the opening 80 through which the projection 81 extends. Also the oil particles in the projection 81 are atomized by the portion of the turbulent fluid flow not entering the lubricant retaining chamber. The atomized oil surrounds the balls 36 of the bearing assemblies 13 to provide the proper lubrication for the same as the drum 14 continues to rotate.

The deflecting scoop 83 also collects excess oil from the ring of oil 84 to maintain the level thereof below or even with the inner surface of the outer race 22 of the bearing assembly 13.

From the foregoing it is seen that means have been provided to properly lubricate rolling element bearings. Further, it is seen that in each example illustrating the invention a portion of the lubricant is dispersed into fine particles which are then atomized to form a mist which surrounds the balls of the bearing assemblies. Also in each example given, the turbulent fluid flow developed by the rotating drum is utilized to atomize the particles of lubricant. Moreover in each example, means are provided to return an excess amount of lubricant to the lubricant retaining chamber.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a lubrication system for lubricating a rolling element type bearing assembly having a plurality of circumferentially spaced rolling elements journalled between an outer race and an inner race wherein the outer race is secured to a rotatable member mounted for high speed rotation and the inner race is mounted on a stationary support comprising a lubricant chamber, a first wick means for conducting lubricant from said chamber, a first tube having two ends with one of the ends communicating with said first wick means and the other end extending a predetermined distance into said chamber and facing in a predetermined direction a second wick means for conducting lubricant to said chamber, and a second tube having two ends, one of said ends communicating with said second wick means and the other of said ends extending a predetermined distance into said chamber and facing in the direction opposite to the direction said first tube faces.

2. A lubrication system for lubricating a rolling element type bearing assembly having a plurality of circumferentially spaced rolling elements journalled between an outer race and an inner race wherein the outer race is secured to a rotatable member mounted for high speed rotation and the inner race is mounted on a stationary support comprising a lubricant retaining chamber provided with a pair of spaced apertures, a wick having a projecting portion and disposed within said chamber with said projecting portion extending through one of said apertures, means for conducting a quantity of lubricant into said chamber and to contact said wick, and scoop means extending angularly away from said chamber and over the other of said apertures.

3. A lubricating means according to claim 2 wherein said wick comprises spherical bronze.

4. A lubrication system for lubricating a rolling element type bearing assembly comprising a stationary support, an inner bearing race mounted on said stationary support, a rotatable member disposed for rotation about said stationary support in a predetermined direction, an outer bearing race secured to said rotatable member, circumferentially spaced rolling elements journaled between said outer and inner races, an angular member projecting inwardly from said rotatable member and disposed adjacent said outer race to form a lubricant retaining chamber, a lubricant reservoir, a first wick disposed within said stationary member and extending therefrom to said lubricant reservoir for conducting lubricant between said chamber and reservoir, a first tube having two ends with one of said ends communicating with said first wick and the other of said ends extending a predetermined distance into said chamber and facing in a direction opposing said predetermined direction of rotation of said rotatable member to control a maximum lubricant level in the lubricant chamber during rotation of the rotatable member, a second wick disposed within said stationary member and extending into said lubricant reservoir for conducting lubricant between said chamber and reservoir, and a second tube having two ends with one of said ends in communciation with said second wick and the other of said ends extending a predetermined distance into said chamber and facing in the predetermined direction of rotation of said rotatable member to permit lubricant to flow into said chamber to enable said first tube to maintain the lubricant at the maximum level.

5. A lubrication system for lubricating a rolling element type bearing assembly, a stationary support, an inner bearing race mounted on said stationary support, a rotatable member disposed for rotation about said stationary support, an outer race secured to said rotatable member, circumferentially spaced rolling elements journaled between said outer and inner races to form a bearing assembly therewith, a lubricant chamber formed integral with said rotatable member and adjacent the outer race of said bearing assembly, a lubricant reservoir, wick means for conducting lubricant, said wick means communicating with said reservoir, tube means communicating with said wick means and extending into said lubricant chamber in a manner to scoop lubricant therefrom lying above the level of the outer race during rotation of said rotatable member and to disperse the lubricant at the level of the outer race into fine particles, and means for rotating said rotatable member to develop a fluid pressure head within said chamber for acting upon said tube means to oppose entry of additional lubricant into said chamber and to develop turbulent fluid flow to atomize and disperse particles of lubricant into a mist to lubricate the rolling elements of said bearing assembly.

6. A lubrication system for lubricating a rolling element type bearing assembly, a stationary support, an inner bearing mounted on said stationary support, a rotatable member disposed for rotation about said stationary support, an outer bearing race secured to said rotatable member, a plurality of circumferentially spaced rolling elements journaled between said outer and inner races to form a bearing assembly, a lubricant chamber formed integral with said rotatable member adjacent the outer race of said bearing assembly, a lubricant reservoir, first wick means for conducting lubricant between said lubricant reservoir and said chamber, first tube means communicating with said first wick means and extending into said chamber in a manner to scoop lubricant from the chamber which lies above the level of the outer race during the rotation of said rotatable member and to disperse the lubricant at the level of the outer race into fine particles, second wick means for conducting lubricant between said reservoir and said chamber, second tube means communicating with said second wick means and extending into said chamber to permit lubricant to enter therein during rotation of said rotatable member, and means for rotating said rotatable member to develop a fluid pressure head within said chamber to act upon said first and second tube means to prevent and permit lubricant to flow from and into said chamber from and to said reservoir through said first and second wick means, respectively, and to develop turbulent fluid flow to atomize and disperse particles of lubricant into a mist to lubricate the rolling elements of the bearing assembly.

7. A lubrication system for lubricating a rolling element type bearing assembly, a stationary support, an inner bearing race mounted on said stationary support, a rotatable member disposed to be rotated about said stationary support, an outer race secured to said rotatable member, circumferentially spaced rolling elements journaled between said outer and inner races to form a bearing assembly, a lubricant retaining chamber provided with a pair of spaced apertures positioned adjacent said bearing assembly, a wick disposed within said chamber and having a projecting portion extending through one of said apertures toward said bearing assembly, means for conducting a quantity of lubricant into said chamber to contact said wick, means for rotating said rotatable member to develop turbulent fluid flow, and scoop means extending angularly away from said chamber and towards said bearing assembly, said scoop means extends over the other of said apertures to direct the turbulent fluid flow into said chamber to atomize the particles of lubricant of said wick to form a mist surrounding said bearing assembly.

8. A lubricating system in accordance with claim 7 wherein said scoop means is positioned to control a maximum amount of lubricant accumulating adjacent said bearing assembly by returning the excess amount to said chamber.

9. A lubrication system for lubricating a rolling element type bearing assembly, a stationary support, an inner bearing race mounted on said stationary support, a rotatable member disposed for rotation about said stationary support, an outer bearing race secured to said rotatable member, circumferentially spaced rolling elements journaled between said upper and inner races to form a bearing assembly, a lubricant retaining chamber provided with a pair of spaced apertures positioned adjacent said bearing assembly, a wick disposed within said chamber, means for conducting a predetermined amount of lubricant into said chamber to contact said wick to saturate the same, means for rotating said rotatable member to develop turbulent fluid flow, and scoop means extending angularly away from said chamber over one of said apertures and toward said bearing assembly to direct a portion of said turbulent fluid flow into said chamber to atomize the lubricant particles from said wick to lubricate the rolling elements of said bearing assembly.

10. A lubrication system for lubricating a rolling element type bearing assembly, a stationary support, an inner bearing race mounted on said stationary support, a rotatable member disposed for rotation about said stationary support, an outer race secured to said rotatable member, a plurality of circumferentially spaced rolling elements journaled between said outer and inner races to form a bearing assembly, a lubricant retaining chamber positioned adjacent said bearing assembly, a wick disposed within said chamber with a portion of said wick projecting therefrom and towards said bearing assembly, means for rotating said rotatable member to develop turbulent fluid flow, means for supplying a quantity of lubricant to said chamber to contact said wick, and means for directing said turbulent fluid flow into said chamber to atomize the lubricant from said wick to lubricate the rolling elements of said bearing assembly.

11. A lubrication system for lubricating a rolling element type bearing assembly comprising a stationary support, an inner bearing race mounted on said stationary support, a rotatable member disposed for rotation about said stationary support, an outer race secured to said rotatable member, a plurality of circumferentially spaced rolling elements journaled between said outer and inner races to form a bearing assembly, a lubricant retaining chamber located adjacent said bearing assembly, means for supplying a quantity of lubricant to said chamber, and means for maintaining the lubricant in said chamber at a predetermined level whereby said means is directed to contact said lubricant to disperse a portion of the same into fine particles during rotation of said rotatable member.

12. A lubrication system for lubricating a rolling element type bearing assembly comprising a stationary support, an inner bearing race mounted on said stationary support, a rotatable member disposed to be rotated about said stationary support, an outer race secured to said rotatable member, circumferentially spaced rolling elements journaled between said outer and inner races to form a bearing assembly, a lubricant chamber disposed adjacent said bearing assembly, a lubricant reservoir, means for conducting lubricant from said lubricant reservoir to said lubricant chamber, and scoop means disposed to project into said lubricant chamber so as to scoop lubricant from said chamber above a predetermined level, said scoop means communicating with said lubricant reservoir so as to return thereto the scooped up lubricant during rotation of said rotatable member.

13. A lubrication system for lubricating a rolling element type bearing assembly comprising a stationary support, an inner bearing race mounted on said stationary support, a rotatable member disposed for rotation about said stationary support, an outer race secured to said rotatable member, a plurality of circumferentially spaced rolling elements journaled between said outer and inner races to form a bearing assembly, a lubricating retaining chamber positioned adjacent said bearing assembly, a wick disposed within said chamber with a portion of said wick projecting therefrom and towards said bearing assembly, means for supplying a quantity of lubricant to said chamber to contact said wick, and means for rotating said rotatable member to develop turbulent fluid flow which acts against said portion of the wick projecting from said chamber to atomize the lubricant therefrom.

14. A lubrication system for lubricating a rolling element type bearing assembly comprising a stationary support, an inner bearing race mounted on said stationary support, a rotatable member disposed for rotation about said stationary support, an outer race secured to said rotatable member, a plurality of circumferentially spaced rolling elements journaled between said outer and inner races to form a bearing assembly, a lubricating retaining chamber positioned adjacent said bearing assembly, a lubricant reservoir, means for conducting lubricant from said lubricant reservoir to said lubricant chamber, means for atomizing a portion of said lubricant in said lubricant chamber, and means for scooping lubricant from said lubricant chamber above a predetermined level, latter said means being connected to return the scooped lubricant to said reservoir during rotation of said rotatable member.

References Cited in the file of this patent

UNITED STATES PATENTS

| | | |
|---|---|---|
| 832,877 | Richards | Oct. 9, 1906 |
| 1,000,188 | Morse | Aug. 8, 1911 |
| 1,467,686 | Reynolds | Sept. 11, 1923 |
| 1,685,517 | Baldwin | Sept. 25, 1928 |
| 1,944,284 | Valentine et al. | Jan. 23, 1934 |
| 2,242,262 | Ray | May 20, 1941 |
| 2,579,039 | Evans | Dec. 18, 1951 |

OTHER REFERENCES

Product Engineering, October 1933, pages 383 thru 387 relied upon.